(12) United States Patent
Matsuzawa

(10) Patent No.: US 9,897,343 B2
(45) Date of Patent: Feb. 20, 2018

(54) WATER HEATING APPARATUS

(71) Applicant: MItsubishi Electric Corporation, Tokyo (JP)

(72) Inventor: Koji Matsuzawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 235 days.

(21) Appl. No.: 14/690,547

(22) Filed: Apr. 20, 2015

(65) Prior Publication Data

US 2015/0338129 A1 Nov. 26, 2015

(30) Foreign Application Priority Data

May 26, 2014 (JP) ................. 2014-107730

(51) Int. Cl.
*F24H 4/04* (2006.01)
*F24H 9/20* (2006.01)
*F24D 3/08* (2006.01)
*F24D 3/18* (2006.01)
(Continued)

(52) U.S. Cl.
CPC ........... *F24H 9/2007* (2013.01); *F24D 3/082* (2013.01); *F24D 3/18* (2013.01); *F24D 19/1069* (2013.01); *F24D 19/1072* (2013.01); *F24H 4/04* (2013.01); *F24D 2200/123* (2013.01);
(Continued)

(58) Field of Classification Search
CPC ....................................................... F24H 4/04
See application file for complete search history.

(56) References Cited

U.S. PATENT DOCUMENTS 4,301,662 A * 11/1981 Whitnah ................... F25B 1/08
237/1 R
4,330,309 A * 5/1982 Robinson, Jr. ...... F24D 19/1054
237/2 B
(Continued)

FOREIGN PATENT DOCUMENTS

CN 102893097 A 1/2013
CN 204705036 U 10/2015
(Continued)

OTHER PUBLICATIONS

Extended European Search Report dated Oct. 12, 2015 in the corresponding EP application No. 15166353.1.
(Continued)

*Primary Examiner* — Nathaniel Herzfeld
(74) *Attorney, Agent, or Firm* — Posz Law Group, PLC

(57) ABSTRACT

A water heating apparatus, including: a heat source circuit including a first circulation pump, a heat pump, and a heat source side of a hot water supply tank heat exchanger that are connected to each other by a pipe, the heat source circuit being configured to allow water to circulate therethrough; a hot water supply circuit including a second circulation pump, a use side of the hot water supply tank-use heat exchanger, and a hot water supply tank that are connected to each other by a pipe, the hot water supply circuit being configured to allow water to circulate therethrough; and a control unit configured to perform, when the hot water supply tank temperature falls below the reheating tank temperature, reheating, and control a flow rate of the second circulation pump.

3 Claims, 2 Drawing Sheets

(51) Int. Cl.
 *F24D 19/10* (2006.01)
 *F25B 30/02* (2006.01)

(52) U.S. Cl.
 CPC ...... *F24D 2220/0207* (2013.01); *F25B 30/02* (2013.01); *F25B 2339/047* (2013.01)

(56) References Cited

U.S. PATENT DOCUMENTS

| | | | | |
|---|---|---|---|---|
| 4,363,221 | A | * | 12/1982 | Singh ...................... F24D 17/02 62/238.6 |
| 5,052,187 | A | * | 10/1991 | Robinson, Jr. ............ F24H 4/04 237/2 B |
| 2002/0000094 | A1 | * | 1/2002 | Kuroki ................... F25B 9/008 62/197 |
| 2010/0031953 | A1 | * | 2/2010 | Penev ................ F24D 17/0021 126/615 |
| 2010/0319378 | A1 | * | 12/2010 | Chikami ................. F24D 3/082 62/238.7 |
| 2011/0219530 | A1 | * | 9/2011 | Hollaway ............ A61H 33/005 4/493 |
| 2012/0055178 | A1 | * | 3/2012 | Takahashi ............. F24H 9/2007 62/79 |
| 2013/0025301 | A1 | | 1/2013 | Maitani et al. |
| 2015/0338129 | A1 | | 11/2015 | Matsuzawa |

FOREIGN PATENT DOCUMENTS

| | | | |
|---|---|---|---|
| DE | 3126392 A1 | 1/1983 | |
| JP | 57204736 A | * 12/1982 | ................ F24H 4/04 |
| JP | 59180235 A | * 10/1984 | ......... G05D 23/1917 |
| JP | 60053734 A | * 3/1985 | ........... F24H 9/2007 |
| JP | 62-29880 U | 2/1987 | |
| JP | 2007-093207 A | 4/2007 | |
| JP | 2009-287794 A | 12/2009 | |
| WO | 2013/084301 A1 | 6/2013 | |

OTHER PUBLICATIONS

Office Action dated Feb. 7, 2017 issued in corresponding JP patent application No. 2014-107730 (and English translation).
Chinese Office Action dated Aug. 21, 2017 for the corresponding CN application No. 201510263326.8(English translation attached).

* cited by examiner

WATER HEATING APPARATUS

TECHNICAL FIELD

The present invention relates to an indirect water heating-type water heating apparatus configured to exchange heat between refrigerant from a heat pump and water, and then exchange heat further between the water and water.

BACKGROUND ART

An indirect water heating-type water heating apparatus is generally used in Europe, which is configured to exchange heat between refrigerant from a heat pump and water, and then exchange heat further between the water and water. Moreover, a temperature thermistor is installed on a hot water supply tank so that, when it is determined that reheating (hot water supply operation) is necessary, high-temperature water is caused to flow into the hot water supply tank, to thereby increase the temperature of water in the hot water supply tank.

In one of related-art water heating apparatus, an electric heater is installed on an upper portion of the hot water supply tank and a temperature sensor is installed on the hot water supply tank at a position at which the temperature sensor can detect at least the temperature of an intermediate-layer portion of the hot water supply tank. When it is determined, with use of the temperature sensor as an input element, that an amount of change in water temperature in the hot water supply tank per unit time is larger than a set value and is negative, the water heating apparatus regards this state as corresponding to an abrupt decrease in average water temperature in the hot water supply tank, and controls an instruction circuit to output a signal so that an electric heater performs heating operation (for example, see Patent Literature 1).

The water heating apparatus disclosed in Patent Literature 1 uses the auxiliary heat source (electric heater) when it is determined that a load is large relative to the change in water temperature in the hot water supply tank, and otherwise uses a heat pump having high operating efficiency, to thereby improve economic efficiency.

CITATION LIST

Patent Literature

Patent Literature 1: Japanese Utility Model Examined Publication No. Sho 62-29880

SUMMARY OF INVENTION

Technical Problem

However, in the related-art water heating apparatus as disclosed in Patent Literature 1, heat supplying capacity of the heat pump is low (for example, about 1.5 kW). Consequently, once the water temperature in the hot water supply tank is decreased, even if heating is performed by the electric heater (for example, about 3 kW), it takes time for the water temperature to reach a target tank temperature after the start of the reheating. Therefore, a user may experience discomfort due to the running out of the hot water.

The present invention has been made in order to solve the above-mentioned problem, and has an object to provide a water heating apparatus capable of performing efficient operation or operation keeping comfort of a user depending on situations.

Solution to Problem

According to one embodiment of the present invention, there is provided a water heating apparatus, including: a heat source circuit including a first circulation pump, a heat pump, and a heat source side of a hot water supply tank heat exchanger that are connected to each other by a pipe, the heat source circuit being configured to allow water to circulate therethrough; a hot water supply circuit including a second circulation pump, a use side of the hot water supply tank heat exchanger, and a hot water supply tank that are connected to each other by a pipe, the hot water supply circuit being configured to allow water to circulate therethrough; and a control unit configured to: compare a hot water supply tank temperature and a reheating tank temperature with each other; and perform, when the hot water supply tank temperature falls below the reheating tank temperature, reheating so that the hot water supply tank temperature becomes a target tank temperature, and control a flow rate of the second circulation pump based on change in temperature in the hot water supply tank.

Advantageous Effects of Invention

The water heating apparatus according to one embodiment of the present invention performs, when the hot water supply tank temperature falls below the reheating tank temperature, the reheating so that the hot water supply tank temperature becomes the target tank temperature, and controls the flow rate of the second circulation pump based on the change in temperature in the hot water supply tank, and hence it is possible to perform efficient operation or operation keeping comfort of a user depending on situations.

DESCRIPTION OF EMBODIMENT

Figure 1:
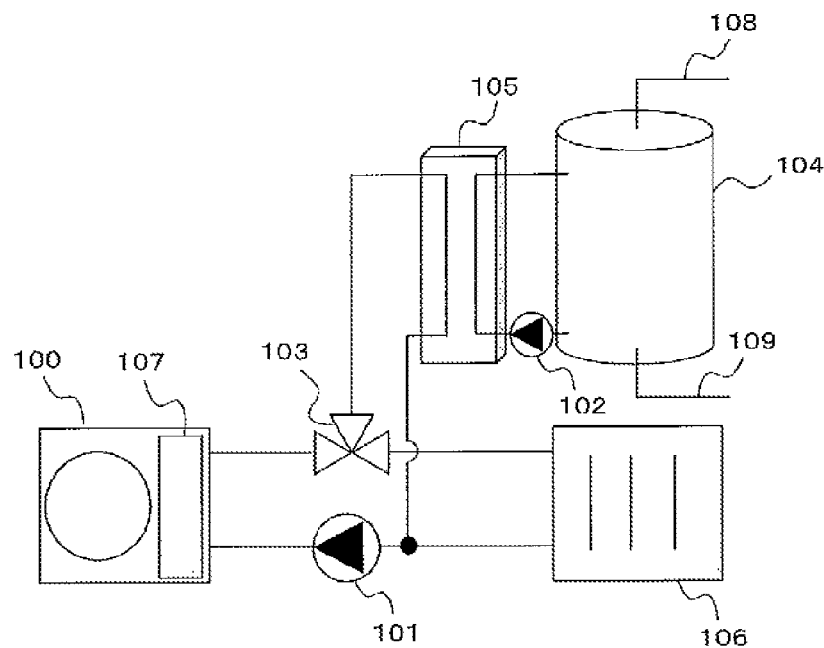
FIG. 1 is a diagram illustrating a water heating apparatus according to an embodiment of the present invention.

Now, an embodiment of the present invention is described with reference to the drawings. Note that, the present invention is not limited to the embodiment described below. Moreover, in the drawings referred to below, the size relationship between components may be different from the reality in some cases.

Embodiment

FIG. 1 is a diagram illustrating a water heating apparatus according to an embodiment of the present invention.

The water heating apparatus includes a heat pump (heat source device) 100, a first circulation pump 101, a second circulation pump 102, a switching valve 103, a hot water supply tank 104, a hot water supply tank heat exchanger 105, a radiator 106, a refrigerant/water heat exchanger 107, a hot water supply pipe 108, and a water supply pipe 109.

Further, the first circulation pump 101, the heat pump 100, and a heat source side of the hot water supply tank-use heat exchanger 105 are connected to each other by pipes, thereby forming a heat source circuit through which water is circulated. Moreover, the second circulation pump 102, a use side of the hot water supply tank heat exchanger 105, and the hot water supply tank 104 are connected to each other by pipes, thereby forming a hot water supply circuit through which water is circulated.

The heat pump 100 includes a refrigerant circuit including the refrigerant/water heat exchanger 107, and generates refrigerant at high temperature (or low temperature) through a refrigeration cycle of air and refrigerant (liquid or gas). Then, the thus obtained refrigerant exchanges heat with water (heating: hot water, cooling: cold water) flowing through the refrigerant/water heat exchanger 107.

The first circulation pump 101 and the second circulation pump 102 are pumps for circulating water, and the second circulation pump 102 is also configured to change a water flow rate.

The first circulation pump 101 allows water to circulate between the refrigerant/water heat exchanger 107 and the hot water supply tank heat exchanger 105, or between the refrigerant/water heat exchanger 107 and the radiator 106. The second circulation pump 102 allows water to circulate between the hot water supply tank 104 and the hot water supply tank heat exchanger 105.

The switching valve 103 is configured to switch a flow of water, and switches the destination of water discharged from the refrigerant/water heat exchanger 107 between the hot water supply tank heat exchanger 105 and the radiator 106.

The hot water supply tank 104 is a tank for storing water, and the hot water supply pipe 108 and the water supply pipe 109 are connected thereto. The hot water supply pipe 108 is a hot water pipe for so-called shower and sanitary equipment use, and supplies high-temperature water to the hot water supply tank 104. The water supply pipe 109 is a water pipe, and supplies the hot water supply tank 104 with cold water (for example, 10 degrees C.). The hot water supply tank 104 is supplied with water and from the water supply pipe 109, and is always filled with water.

The hot water supply tank heat exchanger 105 is arranged outside the hot water supply tank 104, and is configured to exchange heat between water discharged from the refrigerant/water heat exchanger 107 and water discharged from the hot water supply tank 104.

The radiator 106 is used for, for example, floor heating, and is configured to heat a target object (air-conditioned space).

Next, hot water supply (hot water) is described. Note that, in this embodiment, the switching valve 103 switches the destination of water discharged from the refrigerant/water heat exchanger 107 so that the water flows into the hot water supply tank heat exchanger 105.

Water, which is sent to the refrigerant/water heat exchanger 107 by the first circulation pump 101, exchanges heat with the refrigerant of the heat pump 100 to absorb heat so that the water becomes hot water in the refrigerant/water heat exchanger 107, and is then sent to the hot water supply tank heat exchanger 105. Then, the thus obtained hot water exchanges heat with water, which is discharged from the hot water supply tank 104 by the second circulation pump 102, to transfer heat in the hot water supply tank heat exchanger 105, and then returns to the first circulation pump 101.

On the other hand, the water discharged from the hot water supply tank 104 absorbs heat to become hot water in the hot water supply tank heat exchanger 105, and then returning to the hot water supply tank 104.

Figure 2:
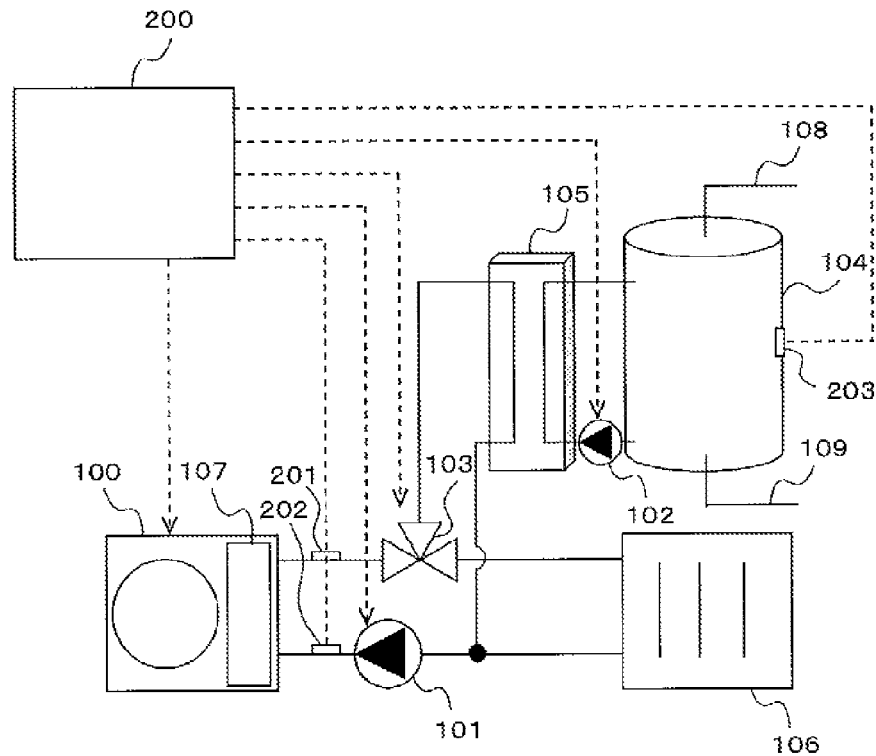
FIG. 2 is a diagram illustrating a connection configuration of a controller mounted on the water heating apparatus according to the embodiment of the present invention.

FIG. 2 is a diagram illustrating a connection configuration of a controller 200 mounted on the water heating apparatus according to the embodiment of the present invention.

As illustrated in FIG. 2, the controller 200, which includes a data collection unit, a condition determination unit, and a control instruction unit, is mounted on the water heating apparatus. Further, the controller 200 collects various data in the data collection unit, determines conditions in accordance with the information of the various data in the condition determination unit, and issues instructions on the ON/OFF control of the first circulation pump 101, the flow rate changing control of the second circulation pump 102, and the like in the control instruction unit.

Note that, the controller 200 corresponds to a "control unit" of the present invention.

Moreover, three temperature thermistors are installed in the water heating apparatus. A supply temperature thermistor 201 is installed on a pipe between the switching valve 103 and the heat pump 100 (or the refrigerant/water heat exchanger 107), a return temperature thermistor 202 is installed on a pipe between the first circulation pump 101 and the heat pump 100 (or the refrigerant/water heat exchanger 107), and a hot water supply tank temperature thermistor 203 is installed on the hot water supply tank 104.

Next, operation of the water heating apparatus is described.

Figure 3:
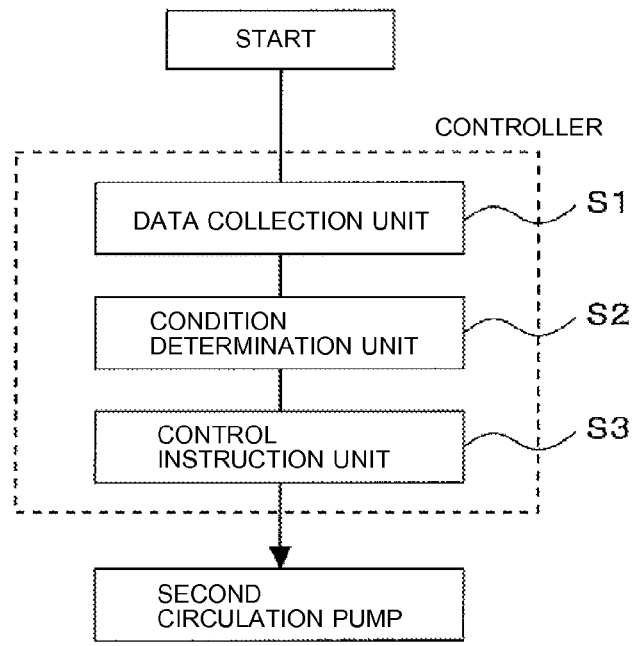
FIG. 3 is a flow chart illustrating control performed by the controller of the water heating apparatus according to the embodiment of the present invention.

FIG. 3 is a flow chart illustrating control performed by the controller 200 of the water heating apparatus according to the embodiment of the present invention.

The data collection unit (S1) of the controller 200 receives setting data from a main remote control (not shown), temperature data from the temperature thermistors, and outdoor unit information (model information, frequency, and the like). Note that, examples of the setting data from the main remote control include a target tank temperature, a reheating tank temperature (temperature at which heating starts in the hot water supply tank 104), and an operation schedule in hot water supply operation.

Next, the condition determination unit (S2) compares a current hot water supply tank temperature (water temperature in the hot water supply tank 104) detected by the hot water supply tank temperature thermistor 203 and the reheating tank temperature (for example, 40 degrees C.) with each other, and determines whether the reheating (hot water supply operation) is necessary. Then, in a case where the current hot water supply tank temperature falls below the reheating tank temperature, high-temperature water flows from the hot water supply pipe 108 into the hot water supply tank 104 to perform reheating so that the current hot water supply tank temperature becomes the target tank temperature. At this time, change in temperature (gradient) in the hot water supply tank 104 in a predetermined period of time (a period of time determined in advance) is also determined.

Note that, the change in temperature in the hot water supply tank 104 is change in water temperature in the hot water supply tank 104 between when the water temperature falls below the reheating tank temperature and predetermined time (for example, 1 minute) before the fall. The change in temperature is obtained with use of a hot water supply tank temperature detected the predetermined time before the fall and the detection time.

Then, in a case where the change in temperature in the hot water supply tank 104 is less than a predetermined second reference value (for example, less than a temperature difference of 10 degrees C.), it is determined that the water temperature is decreased due to radiation loss from the hot water supply tank 104, that is, the water temperature is decreased due to "hot water supply tank radiation loss". On the other hand, in a case where the change in temperature in the hot water supply tank 104 is a predetermined first reference value or more (for example, the temperature difference of 10 degrees C. or more), it is determined that the water temperature is decreased due to use of hot water in the hot water supply tank 104, that is, the water temperature is decreased due to "hot water supply use". Note that, the first reference value and the second reference value are each set to the temperature difference of 10 degrees C. in this embodiment, but the reference values are not limited thereto. Moreover, the first reference value and the second reference value may have the same value or different values.

Based on the above-mentioned determination result, the control instruction unit (S3) instructs the second circulation pump 102 to perform a maximum flow rate operation or a minimum flow rate operation in an operation allowable range. In the case of the "hot water supply tank radiation loss", the control instruction unit (S3) instructs the second circulation pump 102 to perform the maximum flow rate operation so that the water in the hot water supply tank 104 is uniformly reheated to the target tank temperature through forced convection. In this way, efficient operation can be performed. Moreover, in the case of the "hot water supply use", the control instruction unit (S3) instructs the second circulation pump 102 to perform the minimum flow rate operation so that temperature stratification in the water in the hot water supply tank 104 is kept (the water temperature in the hot water supply tank 104 is prevented from decreasing). In this way, comfort of a user can be kept.

In addition, in a case where a predetermined period of time or more has elapsed since the temperature reached the target tank temperature (for example, 55 degrees C.), and the second circulation pump 102 performs the minimum flow rate operation, the condition determination unit (S2) determines that the user currently uses almost no hot water, and the control instruction unit (S3) instructs the second circulation pump 102 to switch to the maximum flow rate operation.

Figure 4:
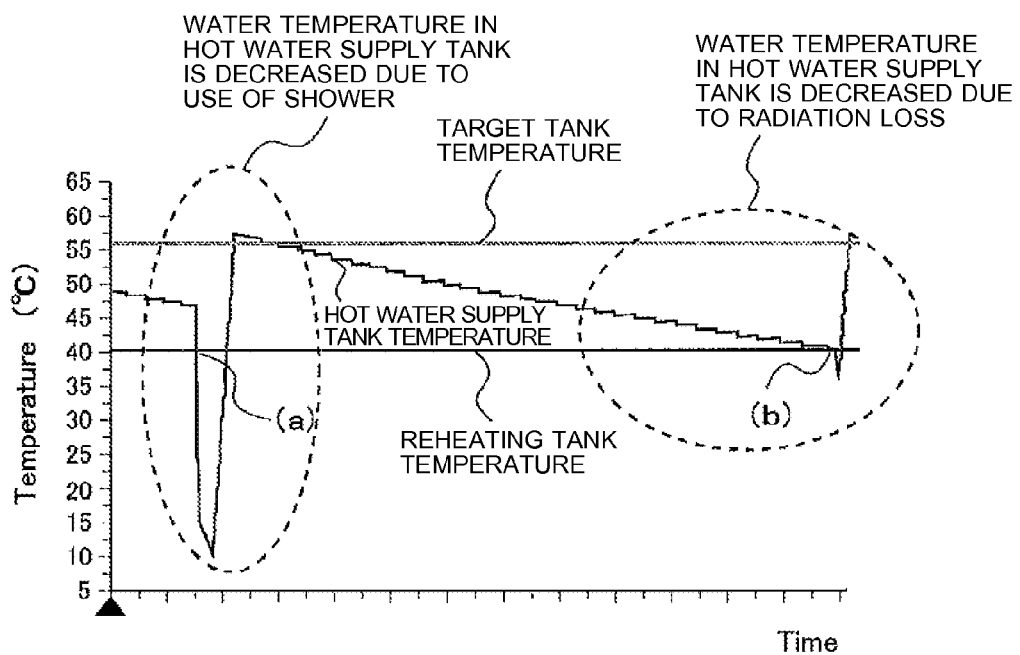
FIG. 4 is a graph showing change in temperature of a hot water supply tank temperature thermistor of the water heating apparatus according to the embodiment of the present invention.

FIG. 4 is a graph showing change in temperature of the hot water supply tank temperature thermistor 203 of the water heating apparatus according to the embodiment of the present invention. Note that, the vertical axis represents temperature and the horizontal axis represents time.

At Point (a) of FIG. 4, the hot water supply tank temperature is abruptly decreased due to the "hot water supply use", whereas at Point (b) of FIG. 4, the hot water supply tank temperature is gradually decreased due to the "hot water supply tank radiation loss".

At Point (a), the hot water supply tank temperature thermistor 203 indicates the decrease from about 50 degrees C. to 10 degrees C. However, it is highly likely that the temperature stratification may occur in the water in the hot water supply tank 104, and a sufficient amount of hot water to be used for the hot water supply may thus remain in the hot water supply tank 104 above a position at which the hot water supply tank temperature thermistor 203 is installed. That is, in a case where the hot water supply tank temperature thermistor 203 is installed in the middle of the tank in the longitudinal direction, the water has 50 degrees C. above the hot water supply tank temperature thermistor 203, and has 10 degrees C. below the hot water supply tank temperature thermistor 203.

On the other hand, at Point (b), the water temperature in the hot water supply tank 104 is decreased due to the "hot water supply tank radiation loss". Consequently, it is supposed that a temperature difference between a temperature detected by the hot water supply tank temperature thermistor 203 and the temperature of the entire tank is small.

As described above, the change in temperature (gradient) in the hot water supply tank 104 is also determined when it is determined whether the reheating is necessary, and hence the efficient operation or the operation keeping the comfort of the user can be performed depending on situations.

REFERENCE SIGNS LIST

100 heat pump 101 first circulation pump 102 second circulation pump 103 switching valve 104 hot water supply tank 105 hot water supply tank heat exchanger 106 radiator 107 refrigerant/water heat exchanger 108 hot water supply pipe 109 water supply pipe 200 controller

201 supply temperature thermistor 202 return temperature thermistor

203 hot water supply tank temperature thermistor

The invention claimed is:

1. A water heating apparatus, comprising:
   a heat source circuit including a first circulation pump, a heat pump, and a heat source side of a hot water supply tank heat exchanger that are connected to each other by a first pipe, the heat source circuit being configured to allow water to circulate therethrough;
   a hot water supply circuit including a second circulation pump, a use side of the hot water supply tank heat exchanger, and a hot water supply tank that are connected to each other by a second pipe, the hot water supply circuit being configured to allow water to circulate therethrough; and
   a control unit configured to:
      compare a hot water supply tank temperature and a reheating tank temperature with each other;
      perform, when the hot water supply tank temperature falls below the reheating tank temperature, reheating so that the hot water supply tank temperature becomes a target tank temperature, and control a flow rate of the second circulation pump based on a change in temperature in the hot water supply tank;
      control, when it is determined that the change in temperature in a predetermined time is a predetermined first reference value or more, the flow rate of the second circulation pump to a minimum in an operation allowable range; and
      control, when it is determined that the change in temperature in a predetermined time is less than a predetermined second reference value, the flow rate of the second circulation pump to a maximum in the operation allowable range.

2. A water heating apparatus of claim 1, wherein the control unit controls the flow rate of the second circulation pump to the maximum in the operation allowable range when a predetermined period of time or more has elapsed since the hot water supply tank temperature reached the target tank temperature and when the flow rate is the minimum.

3. A water heating apparatus claim 1, wherein the control unit comprises:
   a data collection unit configured to receive information at least on the target tank temperature, the reheating tank temperature, and the hot water supply tank temperature;

a condition determination unit configured to determine at least whether the reheating is necessary and the change in temperature in the hot water supply tank; and a control instruction unit configured to instruct the second circulation pump to perform at least one of the maximum flow rate operation or the minimum flow rate operation.

\* \* \* \* \*